United States Patent [19]
Tsao

[11] Patent Number: 5,513,383
[45] Date of Patent: Apr. 30, 1996

[54] MOBILE COMMUNICATION TERMINAL HAVING EXTENDABLE ANTENNA

[75] Inventor: Chich-Hsing A. Tsao, Saratoga, Calif.

[73] Assignee: Space Systems/Loral, Inc., Palo Alto, Calif.

[21] Appl. No.: 412,741

[22] Filed: Mar. 29, 1995

Related U.S. Application Data

[63] Continuation of Ser. No. 121,075, Sep. 14, 1993, abandoned.

[51] Int. Cl.$^6$ ............................. H04B 1/38; H01Q 1/24
[52] U.S. Cl. ............................. 455/89; 455/90; 455/269; 343/702; 343/878
[58] Field of Search .......................... 455/89, 90, 269, 455/270; 379/58; 343/700 MS, 702, 878; 16/225, 366; H01Q 1/24

[56] References Cited

U.S. PATENT DOCUMENTS

| | | | |
|---|---|---|---|
| 4,313,119 | 1/1982 | Garay et al. | 343/702 |
| 4,571,595 | 2/1986 | Phillips et al. | 343/745 |
| 4,920,352 | 4/1990 | Martensson et al. | 343/702 |
| 4,931,809 | 6/1990 | Putman et al. | 343/878 |
| 4,980,694 | 12/1990 | Hines | 343/702 |
| 4,989,012 | 1/1991 | Martensson et al. | 343/702 |
| 5,014,346 | 5/1991 | Phillips et al. | 455/89 |
| 5,148,181 | 9/1992 | Yokoyama et al. | 343/702 |
| 5,168,278 | 12/1992 | Morita | 343/702 |
| 5,170,173 | 12/1992 | Krenz et al. | 455/89 |
| 5,204,687 | 4/1993 | Elliott et al. | 343/702 |

FOREIGN PATENT DOCUMENTS

| | | | |
|---|---|---|---|
| 508299 | 4/1992 | European Pat. Off. . | |
| 175826 | 7/1991 | Japan | 379/58 |
| 404368023 | 12/1992 | Japan | 455/269 |

Primary Examiner—Reinhard J. Eisenzopf
Assistant Examiner—Thanh Le
Attorney, Agent, or Firm—Perman & Green

[57] ABSTRACT

A mobile communication terminal or telephone comprising a handheld main housing incorporating a digital keypad, a speaker and a microphone, and having a planar radiator antenna. The antenna is hingedly-attached to an extension arm element which, in turn, is hingedly-attached at the top of the main housing. During use, the antenna is pivoted above and away from the head of the user by a sufficient distance to significantly reduce or remove the exposure of the user to transmitted RF power of sufficient density to pose a health danger.

3 Claims, 3 Drawing Sheets

MOBILE COMMUNICATION TERMINAL HAVING EXTENDABLE ANTENNA

This is a continuation of application(s) Ser. No. 08/121,075 filed on Sep. 14, 1993, now abandoned

BACKGROUND OF THE INVENTION

1. Field of the Invention

The present invention relates to handheld terminals such as cordless telephones or wireless cellular telephones for sending and receiving signals by means of an antenna and a radio frequency signal processor such as a transmitter or a receiver.

2. State of the Art

Mobile or cellular telephones are becoming more common and popular with motorist whose businesses require them to be easily contacted during time periods when they are driving their vehicles, such as salesmen, doctors and other people who either spend much of their time driving or whose occupations frequently involve emergency situations.

There is much concern that frequent users of radio frequency telephones may be endangered by overexposure to radio frequency energy due to the fact that the handset of such telephones incorporates the antenna which transmits the amplified RF signals, and such antenna is in contact with or closely-spaced from the head of the user. It has alleged that the frequent use of such RF telephones may be responsible for the development of tumors and other medical problems by the users.

The present invention is concerned with improved handheld compact mobile telephone receivers on which the antenna portion or planar radiator portion is hingedly-attached to the speaker portion for deployment between compact folded position and unfolded use position. Compact mobile telephone receivers having hingedly-attached antenna portions are known in the art and reference is made to U.S. Pat. Nos. 5,014,346 and 5,170,173 for their disclosure of such devices. The handheld telephones of the cited patents are designed for compactness, and the planar radiator portion is attached at the bottom of the telephone, away from the speaker unit, so as to be foldable up over the input keypad for storage during periods of non-use, and to be unfoldable into position proximate the mouth or chin of the user during periods of transmission. Such devices are not designed to overcome or avoid the possible health dangers of overexposure to radio frequency energy posed by the proximity of the antenna of RF mobile telephones to frequent users of such telephones, nor do they inherently possess such advantages because the antennae of such compact telephones remain in close proximity to and aimed towards the head of the users when unfolded into use position.

SUMMARY OF THE INVENTION

The present invention relates to handheld terminals or mobile telephones comprising a main speaker/microphone housing portion, such as an RF signal transmitter/receiver unit, and a directional planar radiator antenna portion, and is characterized by the antenna portion being hingedly-connected to an elongate extender portion which, in turn is hingedly connected to the main housing position. This provides a mobile telephone terminal which is foldable into a compact configuration for storage during non-use, and is unfoldable into a deployed configuration in which the directional antenna is spaced above and or away from the head of the user by means of the extender portion and the directional planar radiator antenna is aimed away from the head of the user.

The extender portion is hingedly-connected at the top of the housing portion, the speaker is near the top of the housing portion, and the microphone is located near the bottom of the housing portion, so that the mouth of the user is positioned near the bottom of the housing portion during RF signal transmission. This design assures that the deployed antenna is held in extension above and/or away from the head of the user to further assure that the amplified RF transmission signals generated and emitted during use of the mobile telephone are emitted from the planar antenna surface located above and directed away from the head of the user.

Most preferably the extender portion and the planar antenna portion are hingedly-attached at the top to the main housing so as to be foldable down behind the main housing and to nest in a mating recess for purposes of compactness and appearance.

DISCUSSION OF THE DRAWINGS

FIG. 1 is a perspective view of a handheld terminal or telephone for mobile communications according to an embodiment of the present invention, illustrating the planar radiator antenna and its extender is deployed condition;

FIG. 2 is a perspective view of the terminal or telephone of FIG. 1, illustrating the antenna and its extender folded down behind the main housing and nested into a recessed area in the rear face of the housing; and FIG. 3 is a perspective view of an alternative contactless RF hinge connection suitable for use in place of the non-conductive hinges 15 and 16 of FIG. 1, to avoid the need for the cables 22;

FIG. 4 is an illustration of the RF hinge connection of FIG. 3, with the elements thereof separated for purposes of illustration; and FIG. 5 illustrates operative circuitry for the transmission and reception of radio frequency signals by means of the mobile communications terminals or telephone units of the present invention.

DETAILED DESCRIPTION

Figure 1:
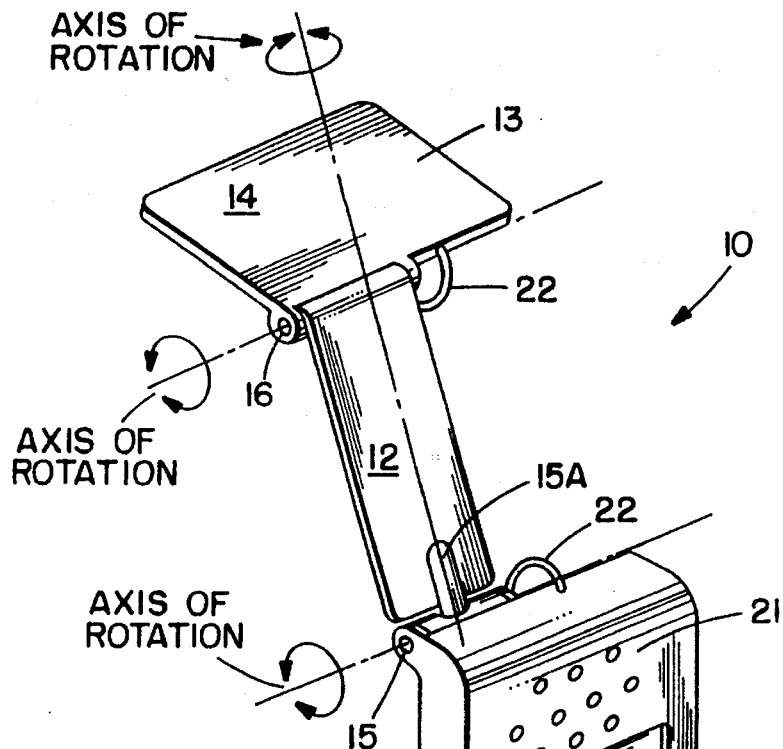
Figure 2:
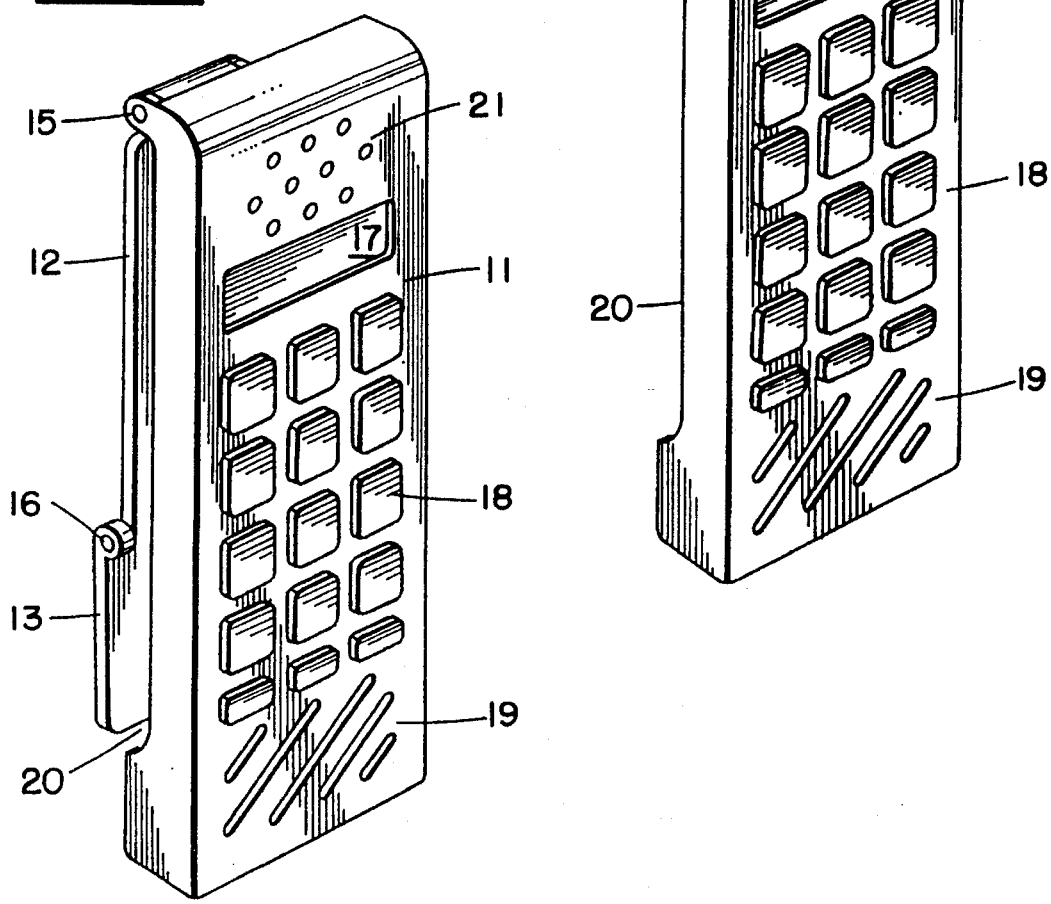

Referring to FIGS. 1 and 2 of the drawings, the present hand terminals or telephones 10 comprise a main elongate housing 11, an elongate extender arm 12, and a planar radiator antenna unit 13 having a directional signal face 14. Hinge connections 15 and 15A rotatably and pivotably join the near end of the extender 12 to the top of the housing 11 and spaced hinge connection 16 rotatably joins the far or remote end of the extender to the antenna unit 13. The ball joint connection 15A permits the arm 12 and antenna unit 13 to be pivoted axially relative to the housing 11.

The elongate main housing 11 includes an upper liquid crystal display window 17, an intermediate digital keypad 18, a microphone 19 which is located at the based of the elongate housing 11, remote from the extender 12 and the antenna unit 13, and an upper speaker 21. Thus, the mouth of the person transmitting a message is normally brought into proximity with the microphone 19, which causes the user to hold the terminal or telephone 10 upright so that the antenna unit 13 is held in extension above and/or away from the head of the user, with the directional radiator surface 14 preferably tilted upwardly and/or away from the head of the user. By proper choice of the antenna transmitting power and the length of the extender 12, the transmitted RF power density from the antenna to the user can be kept well below the RF intensity limits which are considered to pose radiation health hazards. The hinge connections 15, 15A and 16 provide three axes of rotation as shown in FIG. 1, and allow the antenna to point toward the optimum transmission and receptive directions.

FIG. 2 illustrates the terminal or telephone 10 of FIG. 1 in compact retracted condition for storage during periods of non-use. The rear face of the elongate housing 11 comprises a recess 20 provided by the difference in the thickness of the housing 11 between a slim main upper portion and a deeper base portion. The recess 20 is of sufficient length and depth to receive the extender 12 and the antenna unit 13 when they are folded in coplanar relationship, down against the rear face of the housing 11, as illustrated.

The planar radiator antenna 13 comprises a directional sending and receiving face 14 which can incorporate conventional types of antenna circuits such as a microstrip patch circuit, a printed spiral circuit, or other conventional antenna circuits which can provide the proper radiation characteristics, fabricated on a substrate material having the proper dielectric constant to enable reduction in physical size.

Figure 3:
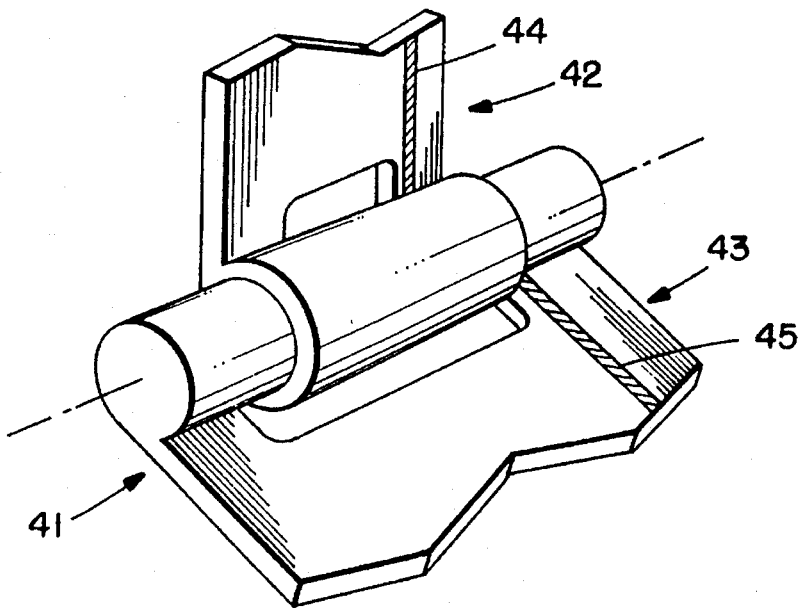
Figure 4:
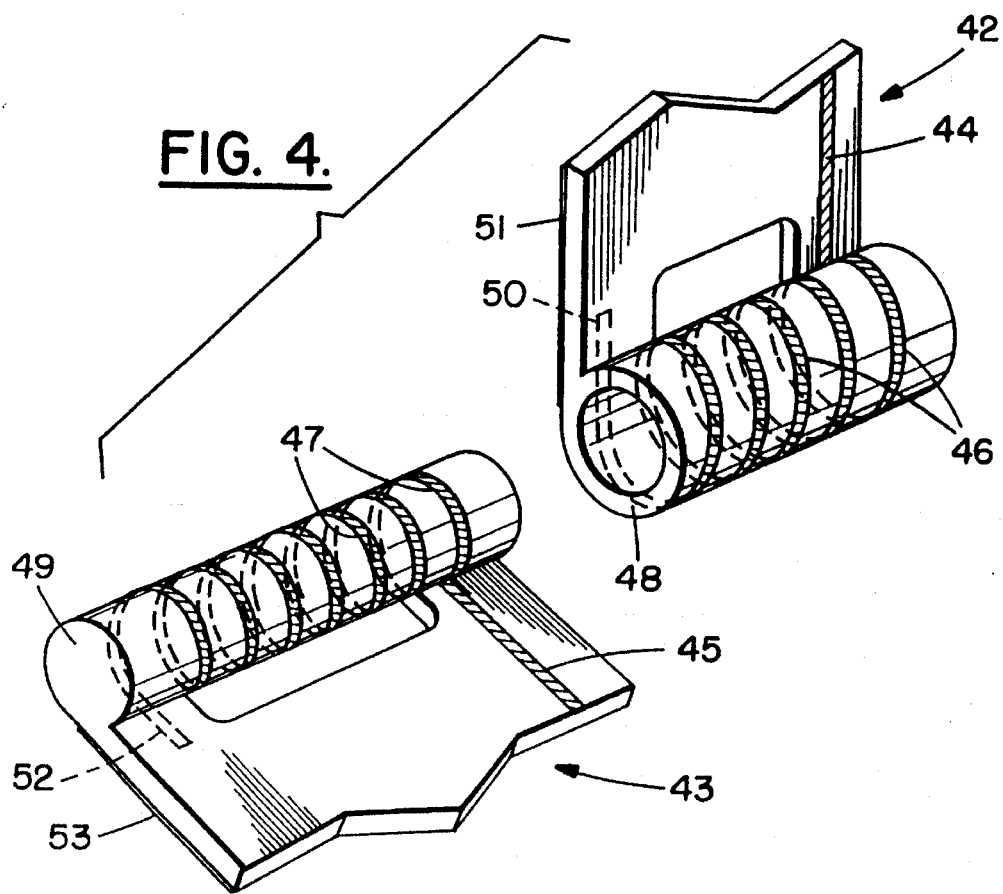

As in apparent to those skilled in the present art, electrical interconnections must De provided between the circuitry located in the main housing 11, through the extender 12 to the antenna(e) located in the antenna unit 13. Such interconnections can be provided by conventional flexible RF cables 22 as illustrated by FIG. 1 and/or by hinges comprising rotatable contactless RF signal couplers as disclosed by aforementioned U.S. Pat. Nos. 5,014,346 and 5,170,173 which are incorporated herein reference. The interconnection can also be accomplished by using a rotatable RF contactless interconnection hinge as illustrated by FIGS. 3 and 4. The RF signal interconnection of FIGS. 3 and 4 is accomplished through inductive coupling between the two coaxial, spiral windings on the inner and outer cylindrical parts of the hinge. It will also be apparent to those skilled in the art that all or part of the RF front end circuitry of the transmission circuit and of the receive circuit of the present terminals or mobile telephones may be located in the main housing 11, in the extender 12 and/or in the antenna unit 13, except for the requirement that the speaker 21 is always located at the top of the housing 11 and the microphone 19 is always located in the base of the housing 11 and the antenna(e) is always located in the planar radiator antenna unit 13. Electrical isolation between the transmitting and receiving component can improve the performance of the present devices by reducing interference. While such isolation is generally provided by interposing frequency filters between the antennae and the respective transmission and reception components, further physical isolation of the components in different ones of the three units making up the present devices, i.e., the main housing 11, the extender 12 and the antenna unit 13, can provide reduced interference and improved performance. In addition, the location of the signal transmission components, including the power amplifier and the LNA thereof, in the planar radiator unit 13 further reduces noise and signal attenuation generally produced by the conduction of RF energy through rotatable signal coupler hinges.

The contactless RF signal hinge interconnection 41 of FIG. 3 may be used to unite the extender arm 42 and member 43 which may be either the antenna, such as 13 of FIG. 1, or the housing, such as 11 of FIG. 1. An interconnection between RF conductive microstrip lines 44 and 45 is accomplished by means of inductive coupling between two coaxially-located, spirally-wound wires 46 and 47 on the inner and outer cylindrical parts 48 and 49 of the hinge. The spiral wire windings can be etched onto the cylindrical parts 48 and 49 in the form of printed circuits, and the parts 48 and 49 must be of dielectric composition. One end of the spiral wire 46 on element 42 is in contact with the conductive line 44 while the other end 50 thereof is in contact with a ground plane 51 on the rear face of the element 42 one end of the spiral wire 47 on element 43 is in contact with the conductive line 45 while the other end 52 thereof is in contact with a ground plane 53 on the rear face of element 43.

Figure 5:
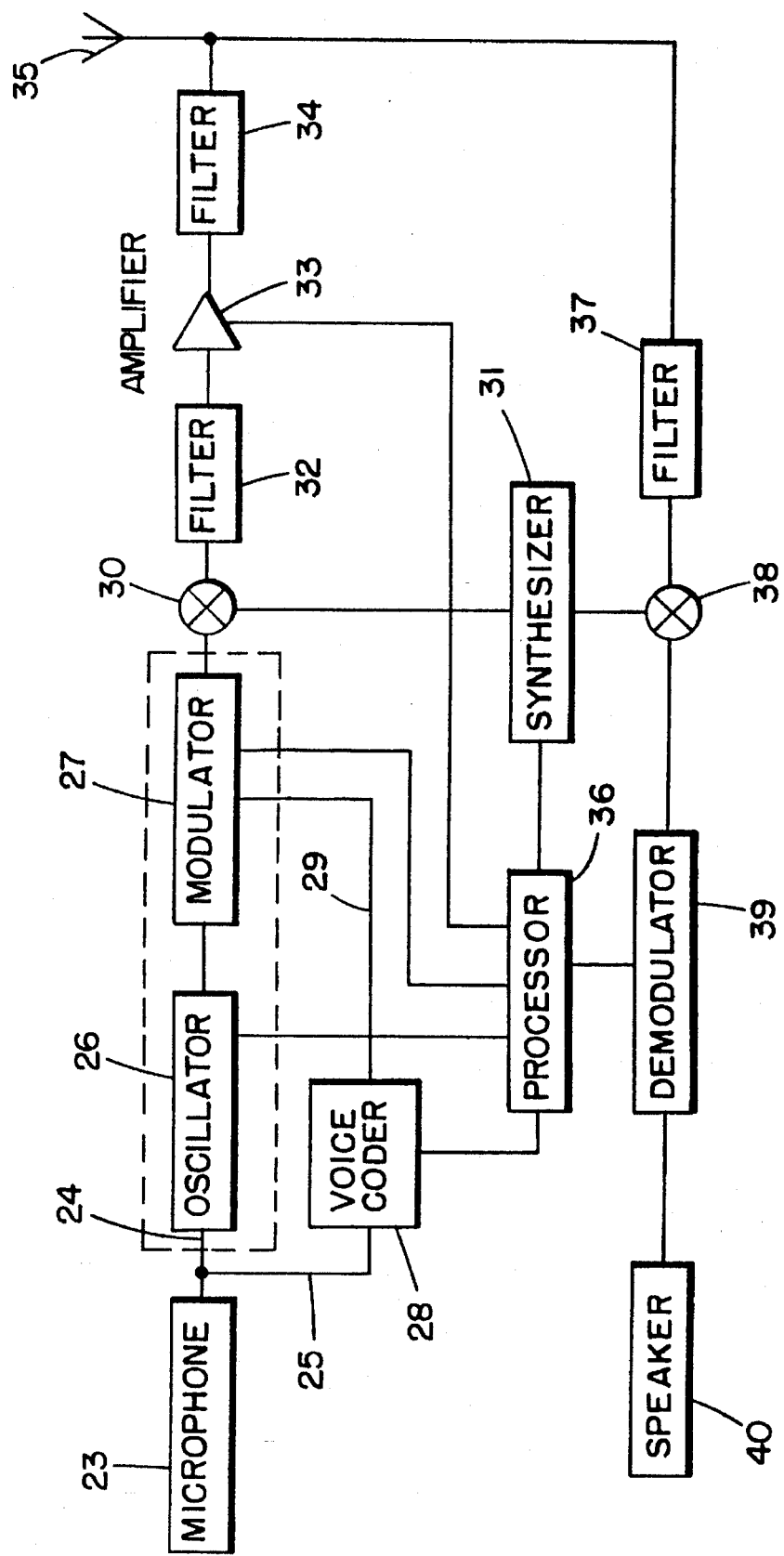

FIG. 5 illustrates a suitable conventional electrical circuit useful in the present terminals or mobile telephones incorporating a single antenna. It will be apparent to those skilled in the present art that portions of the circuitry may be incorporated into different printed circuit boards which can be mounted within the main housing 11 or within the extender 12 or within the antenna unit 13 to physically isolate the portions from each other and/or from the antenna.

The transmission circuit comprises a microphone 23, always located at the base of the main housing 11, for converting voice signals into electrical signals which are transmitted over lines 24 and 25. A processor 36 controls whether the signals from the microphone 23 are modulated by the oscillator 26 to form frequency modulated information signals, or are encoded by the voice coder 28 and modulated at 27 to form composite modulated information signals. When frequency modulation is selected the signal on line 24 are converted to frequency modulated signals by voltage controlled oscillator 26 and conveyed to a modulator 27 which acts as a pass-through. Signals over line 25 are utilized when a discrete encoded signal, modulated to form a composite modulated signal, is to be generated. The line 25 signals are supplied to a voice coder 28 where they are digitalized and encoded to generate signals on line 29 to modulator 27. The frequency modulated or the composite modulated information signals are supplied to a mixer 30 which mixes the signal with an offset carrier wave generated by a synthesizer 31 and supplied to the mixer 30, to generate a modulated signal on a carrier wave of predetermined frequency.

The modulated information signal is passed through the frequency filter 32 which only transmits waves having a frequency proximate the frequency of the carrier wave. The filtered signal containing the modulated information signal is coupled to a transistorized power amplifier 33 which amplifies the signal to transmission power levels and couples them through a duplexer filter 34 to the antenna 35.

The receiving circuit comprises the same antenna 35 which conveys the signals received thereby to a filter 37 which passes signals of the desired frequencies to a mixer 38. The mixer 38 receives an oscillating signal from the synthesizer 31 and generates a mixed signal to a demodulator 39 which couples a demodulated electrical information signal to the speaker 40. The speaker 40 converts the electrical information signals into an audible message.

Alternatively, the present devices may comprise separate transmit and receive antennae as disclosed in aforementioned U.S. Pat. No. 5,014,346. It should be understood that the circuitry of the present devices comprises components which are conventional in the art and may be modified within the knowledge of the art.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A compact terminal or telephone for mobile communications comprising an RF transmission circuitry including a microphone, an RF signal amplifier and an antenna electrically-connected to each other for the transmission of messages, and an RF reception circuitry including an antenna, an RF signal demodulator and a speaker electrically connected to each other for the reception of messages, said terminal or telephone comprising an elongate main housing having a microphone adjacent the bottom portion thereof, and a speaker, an elongate extender element having a face surface, an upper end and a lower end, the lower end of which comprises a ball joint connection to hinge means, said hinge means attaching said extender element to said housing at an upper portion thereof for rotation into storage position parallel to said housing, said ball point connection pivotably-attaching the extender element to the hinge means for axial rotation of said extender element to direct the face surface thereof in any desired direction relative to said housing, and a planar radiator transmission/reception antenna element hingedly-attached to the upper end of said extender element, remote from said lower end, and a flexible RF cable signal coupler means between said main housing, through said extender element to said radiator antenna element to couple the RF transmission circuitry including the microphone of the main housing and the transmission antenna of the antenna element, and to couple the RF reception circuitry including the speaker of the main housing and the reception antenna of the antenna element, whereby for use of the terminal or telephone, the hinge means and the extender element are rotated from storage position to extend above the upper portion of the main housing, the extender element is rotated axially on said ball joint connection to direct the face surface thereof in any desired direction relative to the housing and the planar radiator antenna element is rotated and/or pivoted to face upwardly and away from the user in the direction of optimum transmission and reception, whereby the exposure of the user to intense RF power transmitted by the antenna element is substantially reduced or eliminated.

2. A terminal according to claim 1 in which a portion of the rear face of the main housing comprises a recess to receive the extender element and the planar radiator antenna element when said elements are rotated into coplanar relation and rotated downwardly against said rear face into said recess, to produce a compact terminal during periods of non-use.

3. A terminal according to claim 1 in which the RF transmission circuitry is electrically isolated from the RF reception circuitry to provide reduced interference and improved performance.

* * * * *